US005544198A

United States Patent [19]

Saalfrank

[11] Patent Number: 5,544,198

[45] Date of Patent: Aug. 6, 1996

[54] PROCEDURE FOR THE IDENTIFICATION OF TRANSMITTER OR REGION IN COMMON-WAVE BROADCASTING NETWORKS

[75] Inventor: Werner Saalfrank, Herzogenaurach, Germany

[73] Assignee: Grundig E.M.V., Furth/Bay, Germany

[21] Appl. No.: 94,080

[22] PCT Filed: Dec. 18, 1991

[86] PCT No.: PCT/EP91/02438

§ 371 Date: Sep. 10, 1993

§ 102(e) Date: Sep. 10, 1993

[87] PCT Pub. No.: WO92/13403

PCT Pub. Date: Aug. 6, 1992

[30] Foreign Application Priority Data

Jan. 28, 1991 [DE] Germany .......................... 41 02 408.7

[51] Int. Cl.[6] .................................................... H04L 27/28

[52] U.S. Cl. ........................................... 375/260; 370/69.1

[58] Field of Search ................................ 375/38; 370/21, 370/110.1, 69.1, 74, 76; 455/44, 59, 60, 103, 104

[56] References Cited

U.S. PATENT DOCUMENTS

| | | | |
|---|---|---|---|
| 3,596,001 | 7/1971 | Adrian | 370/20 |
| 4,144,496 | 3/1979 | Cunningham et al. | 455/54.1 |
| 4,541,118 | 9/1985 | Eastmond et al. | 455/59 |
| 5,230,081 | 7/1993 | Yamada et al. | 455/54.1 |

FOREIGN PATENT DOCUMENTS

| | | | |
|---|---|---|---|
| 8200074 | 1/1982 | WIPO | 370/76 |

OTHER PUBLICATIONS

"Station and Programme Identification in FM Journal Broadcasting" Grelis et al. Philips Tech Rev. 39 1980 pp. 216–226.

*Primary Examiner*—Stephen Chin
*Assistant Examiner*—T. Ghebretinsae
*Attorney, Agent, or Firm*—Kane, Dalsimer, Sullivan, Kurucz, Levy, Eisele & Richard

[57] ABSTRACT

The method pertains to wireless transmission in the common-wave operation. For the operation of common-wave networks, it is required that the modulation contents of the transmission frequencies (1 . . . m) transmitted by the individual transmitting stations are identical. However, in order to enable a station or regional identification, one or more regionally differing additional carrier frequencies (n-3 . . . n) are transmitted, whose reception permits the selection of specific regionally related news or messages in the receiver. The demand of additional carrier frequencies may be reduced to four individual frequencies or frequency groups, if these additional carriers are modulated.

6 Claims, 3 Drawing Sheets

PROCEDURE FOR THE IDENTIFICATION OF TRANSMITTER OR REGION IN COMMON-WAVE BROADCASTING NETWORKS

BACKGROUND OF THE INVENTION

1. Field of the Invention

This invention pertains to a common-wave broadcasting network wherein additional carrier frequencies which differ from each other from region to region are emitted in order to make transmitter or regional identification possible. Reception of these additionally carrier frequencies make it possible to select at the receiver specialized regional news.

2. Description of the Prior Art

Analog VHF radio transmission is not able to match the quality standard offered by digital recording media (such as compact discs or Digital Audio Tape 'DAT'). Further, mobile reception in a motor vehicle or with portable devices results in further degradation of the reception. Field intensity fluctuations and multipath reception result in signal distortions, whose effects can be reduced only partially by alternating strategies to alternative reception frequencies (for example, in conjunction with the radio data systems).

Digital radio transmission for mobile reception with the aid of satellites is not presently feasible as it is necessary to use receiver antennas with distinct directional effects in view of the relatively low transmission efficiency. Therefore, work has been in progress for a few years to develop a standard for a new terrestrial digital transmission system known as DAB (Digital Audio Broadcasting), see "Funkschau-Spezial", "Digitaler Ton-Von HGrfunk bis Mobiltelefon", 1990, pages 9–18).

One of the specifics of the planned transmission network is the common wave operation of the transmitting station within a country-wide program offering. This means that in a defined region all transmitting stations simultaneously broadcast with the same modulation on the same transmission frequency or the same carrier frequency.

The COFDM (coded orthogonal frequency division multiplex) transmission procedure is provided wherein within a region, for example the transmission area of a European country, a broadcasting station simultaneously transmits about five or six stereo programs by using a carrier frequency bandwidth of, for example, 1.5 megahertz (in addition to the program related and program independent data). Within the available channel bandwidth, a plurality of individual carriers (for example, 448 carrier frequencies equidistant on the frequency axis) are generated with a 4-DPSK (differential phase shift keying) modulation. By scrambling the digital program data in the time sequence and in the allocation to the individual carrier frequencies, transmission errors due to field intensity fluctuation do not extend over longer time connected signal segments and can therefore be more easily corrected.

A detailed explanation of the principal transmission and coding procedure can be found in the article "Digital Sound Broadcasting to Mobile Receivers" in the "IEEE Transactions on Consumer Electronics", Vol. 35, No. 3, August 1989, pages 493–503).

To establish an overlapping transmission network for an area the size of a European country (or equivalently, a U.S. state), it is necessary to provide a minimum of four different transmission channels of a defined bandwidth B, so that the different programs of the different transmission regions do not interfere with each other. With the aid of four different transmission channels, it is possible to plan the frequency distribution to the individual transmission regions in the form of a four cluster, so that an overlapping region or international transmission network has no adjacent joining zones with a different program, but the same transmission frequency. For the common-wave configuration of the DAB-audio broadcasting, a frequency band with a bandwidth of a total of 4×B is required. Naturally, within a transmission region, also a network of locally limited stations may be established with the aid of the remaining three-cluster-frequencies, so that in addition to the 5 . . . 6 (European) country-wide programs, 6 to 18 local programs may be transmitted.

As previously mentioned, the common-wave operation of a (European) country-wide transmission network, for example, requires 100 percent conformity of the modulation content of the frequency proportion transmitted simultaneously by the individual broadcasting stations, in order to enable interference-free decoding of the program data. However, since the future of DAB-network may soon supersede the current VHF radio traffic, the (European) country-wide transmission of the same traffic news, for example, may contradict the goal of direct region or local traffic broadcasts. Furthermore, a driver who drives from one broadcasting region to another should be provided with rough positional information, so that the driver's receiver can be automatically or manually set to the receiving channel of the neighboring region.

OBJECTS AND SUMMARY OF THE INVENTION

It is therefore an object of the present invention to provide a method and procedure for the identification of a transmitter or region which does not interfere with the common-wave broadcasting operation of the network.

It is therefore a further object of the present invention that the procedure should be able to transmit not regionally related further transmisssion data.

These and other objects are achieved by providing a method and procedure for wireless transmission of digital signals through a broadcasting network operating in the common-wave frequency which simultaneously transmits a plurality of different individual carrier frequencies for all the transmitting stations in the network, which are equidistantly arranged in the frequency axis of a defined transmission frequency band and which are only modulated with portions of the bit sequence representing the digital signals, whereby the modulation contents of the individual carrier frequencies are identical for all transmitting stations of the transmitting region, characterized in that for identifying at least one transmitting station in a local transmitting region, at least one transmission specific or regionally differing unmodulated individual carrier frequencies are simultaneously transmitted from this and, if necessary, other transmitting stations, whose configuration in the frequency domain are evaluated for station identification and which do not interfere with the transmission of these signals in the common-wave operation within overlapping transmission areas of individual transmitting stations, due to the reception of these signals separately from the information and control signal modulation.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1A:
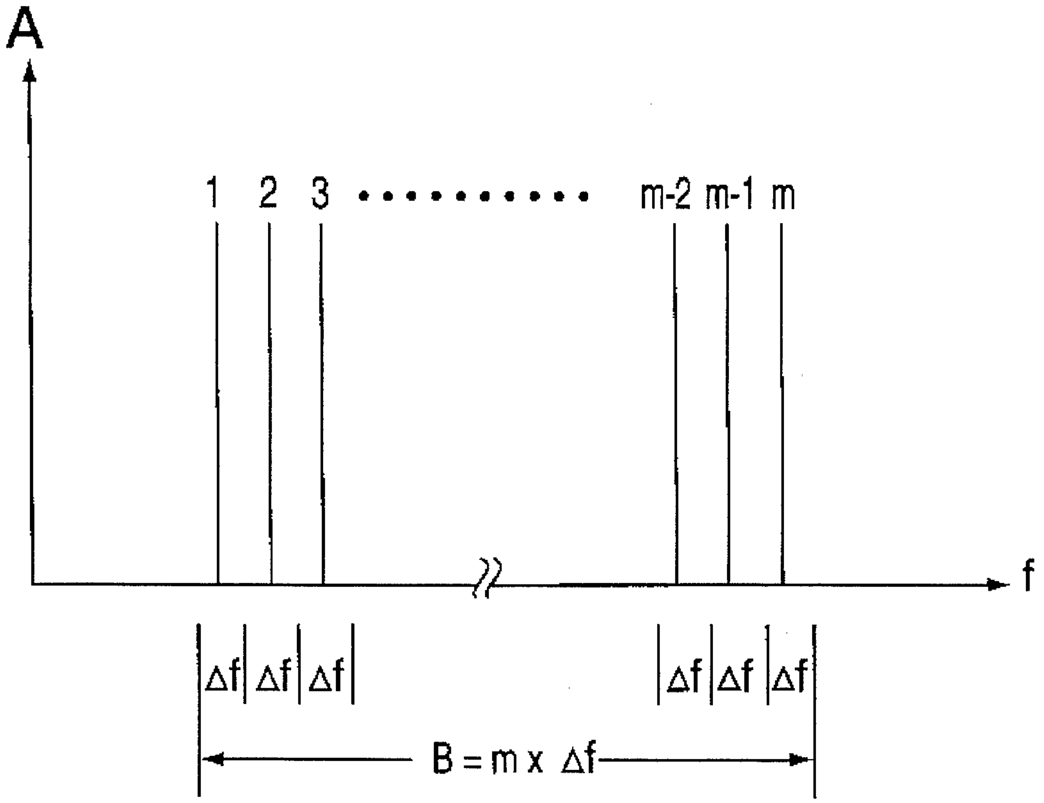
FIG. 1*a* is the schematic of the carrier frequency configuration of the present invention for a region (i.e., European country or similar size) related common-wave network.

Referring now to the drawings in detail wherein like numerals refer to like elements throughout the several views, one sees that in FIG. 1*a,* the method includes the transmission of m carrier frequencies (for example, 448) with equidistant frequency distance Δf within the bandwidth B.

The individual carriers are each modulated with a portion of the digital data, whereby the modulation contents of the individual carriers for all transmitting stations are identical for a transmission region. If the procedure and method are performed in time multiplex operation, the data of the different programs are transmitted in timely sequence within a data packet, so that for a program change within the program selection of a particular broadcasting station, no change of the tuning frequencies in the receiver has to be performed, but only a switching-over of the timely associated decoding of the data packets. The data content of a program is not limited to audio signals, but may additionally include information and control data (for example, video transmission or traffic guidance data).

Figure 2:
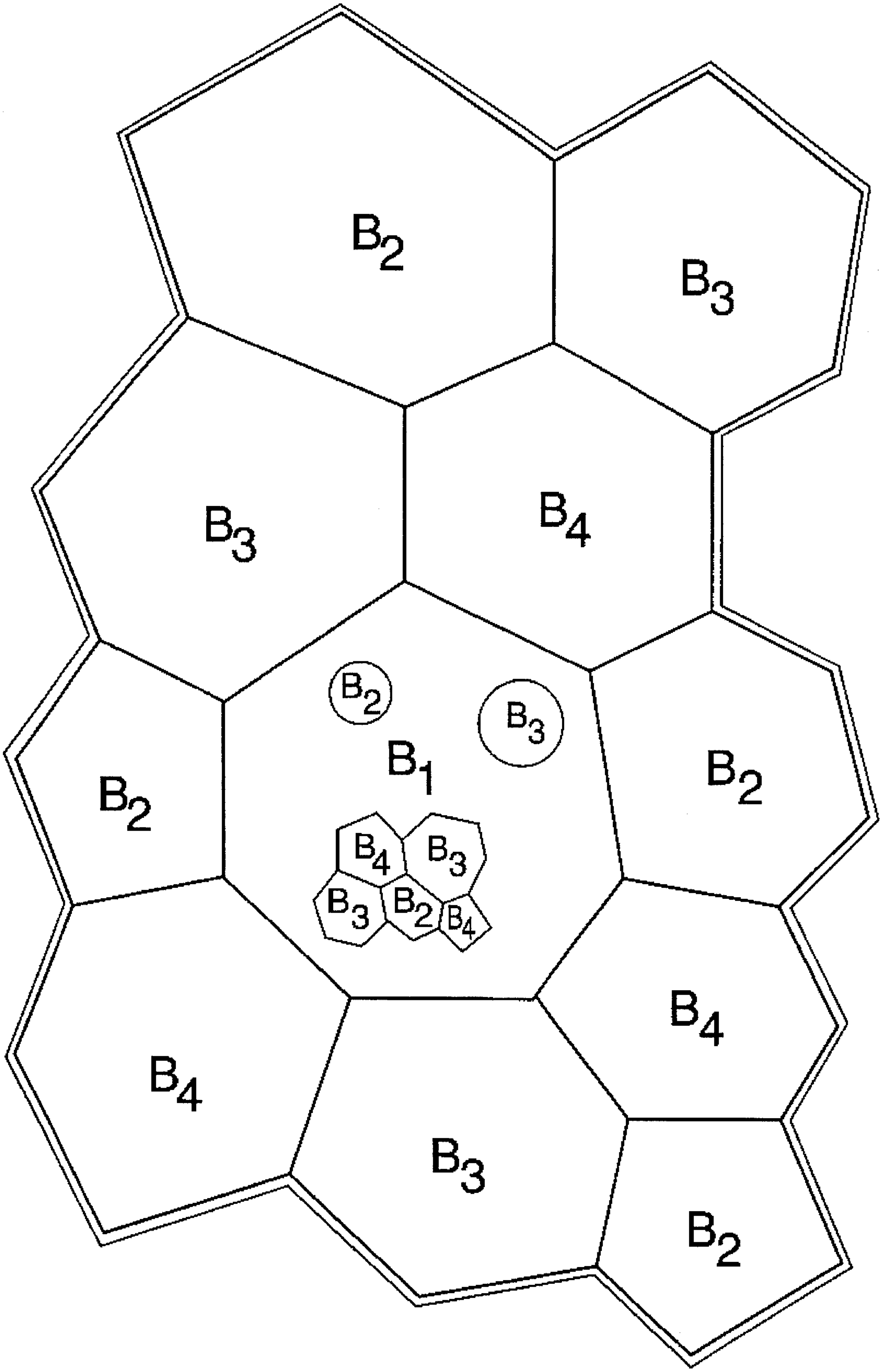
FIG. 2 is a schematic of the frequency distribution in the form of a four-cluster as used in the present invention.
Figure 3:
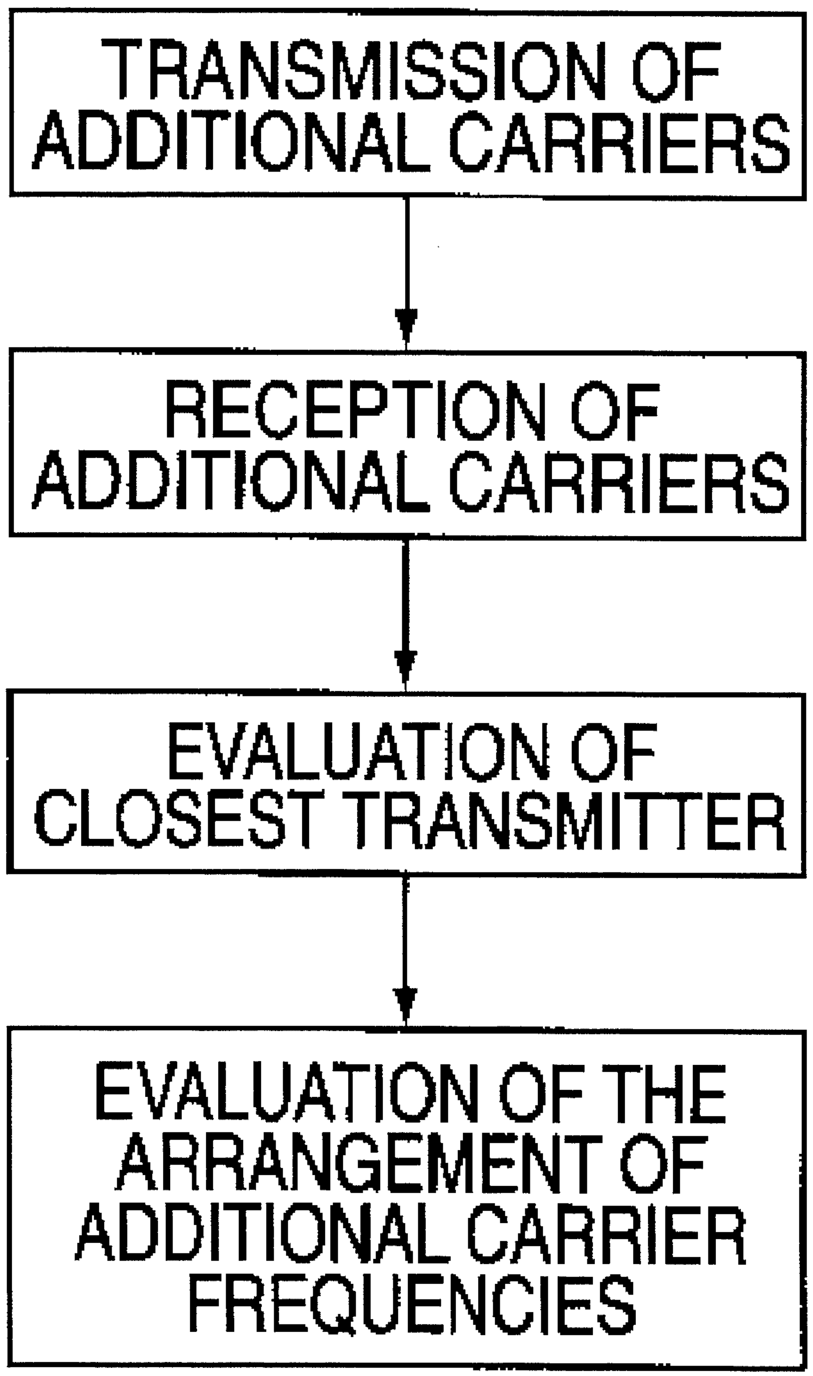
FIG. 3 is a flowchart of an aspect of the apparatus of the present invention.

Outside of the transmission region (typically the size of a European country or a U.S. state) of a broadcast station with the carrier frequency range B1 the same carrier frequencies naturally may not be used by a station with a different program selection, because otherwise no clear program decoding would be possible in the overlapping area of both transmission regions. Therefore, a separate carrier frequency range B2 must be assigned to this adjoining transmission region. It can be seen from FIG. 2 that by using at least four separate frequency ranges, B1, B2, B3, B4, a frequency allocation may be provided wherein the regions with the same carrier frequency range do not adjoin each other (analogous to the theorem that no more than four colors are required in a two-dimensional map to avoid any adjoining regions of the same color).

However, within a transmission region, locally limited stations can be embedded with another program selection, if the remaining three cluster-frequencies are assigned thereto and if it is assured that their transmission does not overlap into adjacent transmission regions having the same carrier frequency range.

In order to assure an interference-free common wave operation within a transmission region, all carrier frequencies used for program and data transmission must be generated with an identical modulation content, that is, regional or station specific identification is not possible within the program information. However, to receive a specific selection from the region-wide traffic news, for example, or to receive regional alerts or emergency broadcasts, it is necessary to provide a coarse local orientation for the receiver by means of a specific station identification. In this manner, all stations of a given region may be provided with the same identification if the news is important throughout a wider geographic range. To recognize which specific transmitting station within the regional common-wave network is closest to the receiver, the field intensity and/or the number or timing sequence of the received echo of the receiving signal, which is provided with a special identification, may be evaluated.

Figure 1B:
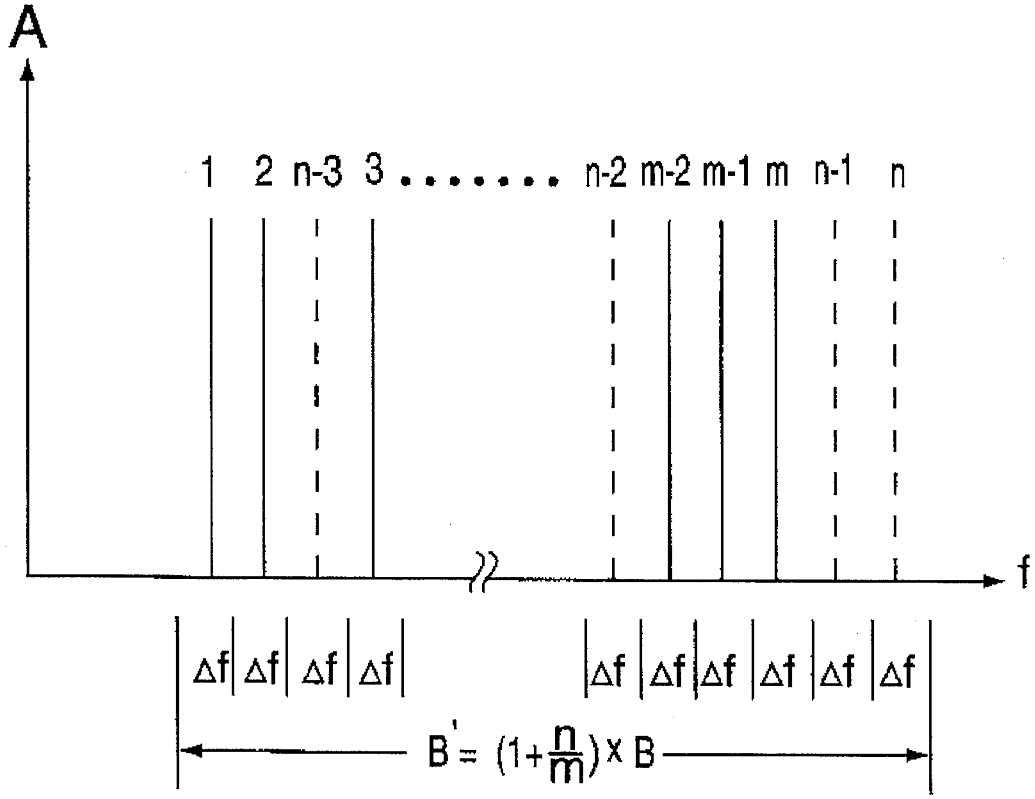
FIG. 1*b* is a schematic of the carrier frequency configuration of the present invention in accordance with FIG. 1*a,* including an additional transmitter or region identification.

In accordance with FIG. 1*b,* the identification may be performed via n non-modulated carrier frequencies (dash dot lines; n-3 . . n) which are additionally transmitted to the carrier frequencies 1 . . . m used for the program transmission in accordance with FIG. 1*a.* These additional n carriers may be inside or outside of the frequency band required for the program transmission at any given location, but only within the predetermined frequency raster. In any case, the bandwidth to be transmitted is enlarged from B to B'. The configuration of the additional carrier frequencies in the frequency range to be transmitted permits multiple variations in the identification.

The additional carrier frequencies required for station identification result in a considerable widening of the transmitting frequency bandwidth B' with a great number of transmitting stations within a transmission region. This disadvantage can be eliminated if one or a plurality of these additional carriers are modulated with a specific identification signal. In order not to interfere with the common-wave broadcasting, at least four groups of additional carriers may be provided, analogous to the configuration disclosed in FIG. 2, whose local use is planned so that no common influence occurs. The identification signals are modulated on the additional carriers in the same manner as the aforementioned COFDM-procedure.

By the modulation of the additional carriers with identification signals, any number of sub-common-wave networks, in relation to the additional carriers, may be formed within large area common-wave broadcasting networks. For transmission of regionally independent data, the additional carriers may be modulated, for example, with switch or synchronous signals. Since there is sufficient time for evaluating the additional signals or enough redundancy for the prevention of errors within the transmission capacity of individual additional carriers, the additional frequency requirement may be limited to one additional carrier in most cases, instead of to an entire group.

With the aid of transmission or regional identification, it is also possible to identify the change into an adjoining transmission region with a deviating program selection in a timely manner during the mobile reception in border crossing traffic. The orientation is performed by comparing the perceived identification with one, stored in the internal memory of the receiver, based on the identification list for the entire transmission area. Thus the receiver may be adjusted manually or automatically to the carrier frequency group of the new transmission region as soon as the quality of the hitherto transmission signal as received is no longer adequate.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method for radio transmission of digital signals through a broadcasting network operating in the common-wave frequency comprising the steps of:

simultaneously transmitting a plurality of different carrier frequencies for each of a plurality of transmitting stations within the broadcasting network, said different carrier frequencies being equidistantly arranged in a frequency axis of a defined transmission frequency band;

modulating each of said plurality of different carrier frequencies only with portions of a bit sequence representing said digital signals, whereby modulation results of said different carrier frequencies are identical for each of said plurality of transmitting stations of a transmitting region;

identifying at least one transmitting station in a transmitting region by way of simultaneously transmitting at least one unmodulated additional carrier frequency corresponding to a unique transmitter or region from at least one transmitting station, receiving said unmodulated additional carrier frequencies and evaluating the presence and frequency of said unmodulated additional carrier frequencies in a frequency raster for identification of said unique transmitter or region, wherein said unmodulated additional carrier frequencies do not interfere with transmission of said digital signals in common-wave operation within overlapping transmission areas of each of said plurality of transmitting stations, due to the processing of said signals separately from modulation of said digital signals.

2. The method of claim 1 further including the steps of separating said at least one unmodulated additional carrier frequency which is added to the individual transmitting stations or regions in the broadcasting network into at least four groups, whereby identical frequencies are simultaneously used in transmitting regions substantially separated from each other; and modulating said at least one unmodulated additional carrier frequency with at least one specific identification signal for identification.

3. The method of claim 2 further comprising the steps providing COFDM modulation in said common wave networks and modulating said at least one specific identification signals using COFDM modulation.

4. The method of claim 2 wherein the step of modulating said at least one unmodulated additional carrier frequency includes one and only one unmodulated additional carrier frequency per group.

5. The method of claim 4 further including the step of modulating said at least one unmodulated carrier additional frequency with additional data.

6. The method of claim 5 further including the step of forming sub-common-wave networks within the common-wave broadcasting network which is separated in the form of clusters by including at least one identification carrier per cluster.

* * * * *